United States Patent [19]
Schiessl et al.

[11] Patent Number: 4,954,614
[45] Date of Patent: Sep. 4, 1990

[54] PROCESS FOR MINIMIZING RESIDUAL HYDRAZINE IN POLYMER LATICES

[75] Inventors: Henry W. Schiessl, Northford; Steven A. Manke, Wallingford, both of Conn.

[73] Assignee: Olin Corporation, Cheshire, Conn.

[21] Appl. No.: 350,653

[22] Filed: May 11, 1989

[51] Int. Cl.$^5$ ............................ C08F 6/10; C08F 6/16; C08F 6/24
[52] U.S. Cl. .................................. 528/483; 524/566; 525/339; 528/493; 528/496
[58] Field of Search ................ 524/566, 521; 525/339; 528/483, 492, 493, 496; 564/464

[56] References Cited

U.S. PATENT DOCUMENTS

| | | | |
|---|---|---|---|
| 4,317,741 | 3/1982 | Lederle et al. | 564/464 |
| 4,452,950 | 6/1984 | Wideman | 525/339 |
| 4,532,318 | 7/1985 | Abubakari et al. | 528/483 |

Primary Examiner—Joseph L. Schofer
Assistant Examiner—Thomas McDonald, Jr.
Attorney, Agent, or Firm—Dale L. Carlson

[57] ABSTRACT

This invention relates to a process for reducing or eliminating hydrazine from a mixture containing hydrazine and a polymer, wherein the polymer is in latex form.

10 Claims, No Drawings

PROCESS FOR MINIMIZING RESIDUAL HYDRAZINE IN POLYMER LATICES

Various forms of hydrogenated nitrile rubbers have recently been introduced into the marketplace. Hydrogenated nitrile rubber has the advantage of being resistant to oxidative degradation at high temperature, as well as being resistant to corrosive environments such as acid environments. These materials are finding utility in the manufacture of fan belts, seals, gaskets, and hoses in increasingly small and hot-running car engines.

One process for the production of hydrogenated polymers in latex form, particularly hydrogenated latex rubber, utilizes hydrazine and an unsaturated polymer as the starting materials. This process is more particularly described in U.S. Pat. No. 4,452,950, assigned to the Goodyear Tire and Rubber Company. However, the product produced in accordance with the process described in the '950 patent suffers from the disadvantage of containing residual unreacted hydrazine. This residual hydrazine is considered undesirable from an environmental and/or toxicity standpoint.

In view of the above, it would be highly desirable to provide a process for the elimination and/or reduction of the residual hydrazine in the polymer product mixture.

In one aspect, the present invention relates to a process for reducing or eliminating hydrazine from a mixture of hydrazine and polymer, wherein said polymer is in latex form, which comprises contacting said hydrazine in said mixture with an oxygen-containing gas at an elevated pressure and a temperature of between about 20° C. and about 100° C., preferably between about 20° C. and about 50° C., in the presence of a hydroquinone catalyst in order to effect a reaction of said hydrazine with said oxygen-containing gas in order to produce a purified mixture containing a reduced amount of hydrazine.

This and other aspects will become apparent upon a reading of the following detailed description of the invention.

The catalyst useful in the present invention is a quinone or hydroquinone catalyst. The catalyst is used in a "catalytically-effective amount", i.e. an amount sufficient to catalyze the destruction of at least some of the hydrazine in the polymer/hydrazine mixture by virtue of catalysis of a hydrazine reaction with the oxygen in the oxygen-containing gas. Although the preferred hydroquinone catalyst is quinone or hydroquinone itself, derivatives of hydroquinone can be used such as alkyl (preferably lower alkyl), carboxylic acid, or sulfonyl-substituted derivatives of quinone or hydroquinone. The catalyst is employed in a catalytically-effective amount, preferably between about 0.1 and about 1 percent based upon the total weight of latex.

The process in accordance with the present invention employs an oxygen-containing gas. The oxygen-containing gas reacts with hydrazine to produce water and nitrogen. The oxygen-containing gas is preferably air or oxygen, most preferably oxygen. The oxygen-containing gas is suitably employed in an amount of between about 100 to 300 percent excess, based on the total amount of hydrazine to be reacted.

The polymer/hydrazine mixture generally contains a major amount (i.e. typically greater than 70 weight percent) of water, saturated polymer (typically about 5 to about 25 weight percent), a minor amount of unsaturated polymer (typically between about one and five weight percent), and a minor amount (typically between about 0.1 and about 3 weight percent) of hydrazine, wherein the weight percents are based upon the total weight of the latex. For most applications, it is preferred that the amount of unsaturated polymer in the latex and the amount of hydrazine be minimized in the mixture. Reduction or elimination of the unsaturated polymer by conversion to saturated polymer is helpful in reducing the reactivity of the polymer latex. Reduction or elimination of the hydrazine in the mixture provides a mixture having reduced toxicity. The process of the present invention provides multiple advantages by both (a) reducing the amount of hydrazine in the mixture and converting at least some of the unsaturated polymer to saturated polymer.

As disclosed more fully in U.S. Pat. No. 4,452,950, incorporated herein by reference in its entirety, the polymer/hydrazine mixture in latex form is prepared by hydrogenation of unsaturated polymers. Prior to hydrogenation, the unsaturated polymers are typically composed of 5 to 100 percent by weight of a conjugated diene monomer unit and 95 to 0 percent by weight of an ethylenically-unsaturated monomer unit. Specific examples of the conjugated diene monomer are 1,3-butadiene, 2,3-dimethylbutadiene, isoprene, and 1,3-pentadiene, specific examples of the ethylenically unsaturated monomer include unsaturated nitriles such as acrylonitrile and methacrylonitrile, monovinyl aromatic hydrocarbons such as styrene, (o-, m-, and p-) alkylstyrenes, divinyl aromatic such as divinylbenzene, dialkenyl aromatics such as diisopropenylbenzene, unsaturated carboxylic acids and the esters thereof such as acrylic acid, methacrylic acid, crotonic acid, itaconic acid, maleic acid, methyl acrylate, ethyl acrylate, butyl acrylate, 2-ethylhexyl acrylate and methyl methacrylate; vinylpyridine; and vinyl esters such as vinyl acetate.

The conjugated diene polymer may be one prepared by any method of preparation, such as emulsion polymerization, solution polymerization or bulk polymerization. Specific examples of the conjugated diene polymer include polyisoprene, polybutadiene, a styrene/butadiene (random or block) copolymer, an acrylonitrile/-butadiene (random or blocked) copolymer, a butadiene/isoprene copolymer, and an isoprene/isobutylene copolymer.

The process of the present invention is suitably effected at an elevated pressure, preferably between about 20 and about 700 psig, more preferably between about 30 psig and about 200 psig, most preferably between about 30 psig and about 100 psig. The process is suitably effected at a temperature of between about 20° C. and about 100° C., more preferably between about 20° C. and about 50° C. The reaction time for the process of the present invention can vary over a wide range, but is preferably between about 1 hour and about 50 hours, more preferably between about 1 hour and about 25 hours, most preferably between about 1 hour and about 20 hours.

The following examples are intended to illustrate, but in no way limit the scope of, the present invention.

EXAMPLE 1

An acrylonitrile/butadiene rubber with 66.2 weight percent butadiene and an average molecular weight of about 200,000 was hydrogenated in latex form with a mixture of hydrazine and hydrogen peroxide in a manner approximately as described in Wideman, without a metal ion initiator. After achieving about 91 percent conversion of the C=C double bonds, the run was interrupted. At this point in the reaction, the latex contained 3.76 weight percent unreacted hydrazine based on the weight of the aqueous phase of the latex. This latex was placed in a pressure vessel, along with ca 0.2 weight percent hydroquinone as catalyst, the vessel flushed with pure oxygen several times and then pressured with pure oxygen to about 40 psig and allowed to react at the autogeneous temperature, which generally was between 20° C. and 50° C. This operation of flushing and filling the pressure reactor was repeated several times in order to provide sufficient oxygen for the reaction with hydrazine. The final hydrazine concentration after this oxygen treatment was about 100 ppm, based on the total weight of latex. The total time of treatment was about 20 hours under pressure.

COMPARATIVE EXAMPLE A

A latex hydrogenated as described in Example 1 and hydroquinone as catalyst, were charged to a reaction flask and reacted with oxygen by bubbling the oxygen gas through the latex at atmospheric pressure at an autogeneous temperature of about 20° C. to 45° C. until a large excess of oxygen had been introduced. The original concentration of hydrazine before the oxygen treatment was 3.2 percent and the level after was still 2833 ppm, based on the total weight of latex. This indicates that it is highly desirable to carry this operation out under pressure.

COMPARATIVE EXAMPLE B

A partially hydrogenated latex was prepared as described in Example 1. When the hydrogenation step was interrupted, the latex contained about 2.4 percent hydrazine, based on the total weight of the latex. This was then subjected to a pressurized oxygen treatment as described in Example 1, except that no hydroquinone catalyst was employed. After 6.5 hours of reaction, the latex contained 2.3 percent hydrazine, indicating essentially no reaction. The run was then interrupted in order to add a catalytic amount of hydroquinone and the pressurized oxygen reaction continued for another 6.5 hours, after which the hydrazine level had been reduced to about 150 ppm. This indicates the necessity for carrying out this reaction in the presence of a catalyst such as hydroquinone.

EXAMPLE 2

U.S. Pat. No. 4,079,018 teaches the use of a metal complex as a catalyst for the reaction of hydrazine with oxygen. Such a complex is, for example, a cobalt-EDTA complex. When air was passed through a 34.9 percent aqueous solution of hydrazine containing this catalyst, the hydrazine level changed to 33.64 percent over a period of 2 hours. This experiment was then interrupted in order to add, as a second catalyst, a small portion of hydroquinone. Air was then bubbled through the solution at about 50° C. for a period of about 7 hours, during which the hydrazine level dropped only to 32.73 percent. This indicates the desirability of using pure oxygen instead of air in order to carry out this reaction in any reasonable time under these mild conditions.

The Examples and Comparative Examples demonstrate the desirability of removing residual hydrazine from a hydrogenated rubber latex by reacting the latex under mild thermal conditions in a process that involves all of the following: a catalyst, essentially pure oxygen or air enriched in oxygen, and elevated pressures.

What is claimed is:

1. A process for reducing or eliminating hydrazine from a mixture of hydrazine and polymer, wherein said polymer is in latex form, which comprises contacting said hydrazine in said mixture with an oxygen-containing gas which is air or oxygen at an elevated pressure and a temperature of between about 20° C. and about 100° C. in the presence of a quinone or hydroquinone catalyst in order to effect a reaction of said hydrazine with said oxygen-containing gas in order to produce a purified mixture containing a reduced amount of hydrazine.

2. The process of claim 1 wherein said pressure is between about 20 and about 700 psig.

3. The process of claim 1 wherein said pressure is between about 30 psig and about 200 psig.

4. The process of claim 1 wherein said pressure is between about 30 psig and about 100 psig.

5. The process of claim 1 wherein said temperature is between about 20° C. and about 100° C.

6. The process of claim 1 wherein said temperature is between about 20° C. and about 50° C.

7. The process of claim 1 wherein said reaction is conducted for a reaction time of between about 1 hour and about 50 hours.

8. The process of claim 1 wherein said reaction is conducted for a reaction time of between about 1 hour and about 25 hours.

9. The process of claim 1 wherein said reaction is conducted for a reaction time of between about 1 hour about 20 hours.

10. The process of claim 1 wherein said oxygen-containing gas is pure oxygen, or air, or a combination thereof.

* * * * *